E. J. LA DUE.
SCALE.
APPLICATION FILED MAR. 27, 1911.
1,025,145.
Patented May 7, 1912.
2 SHEETS—SHEET 1.
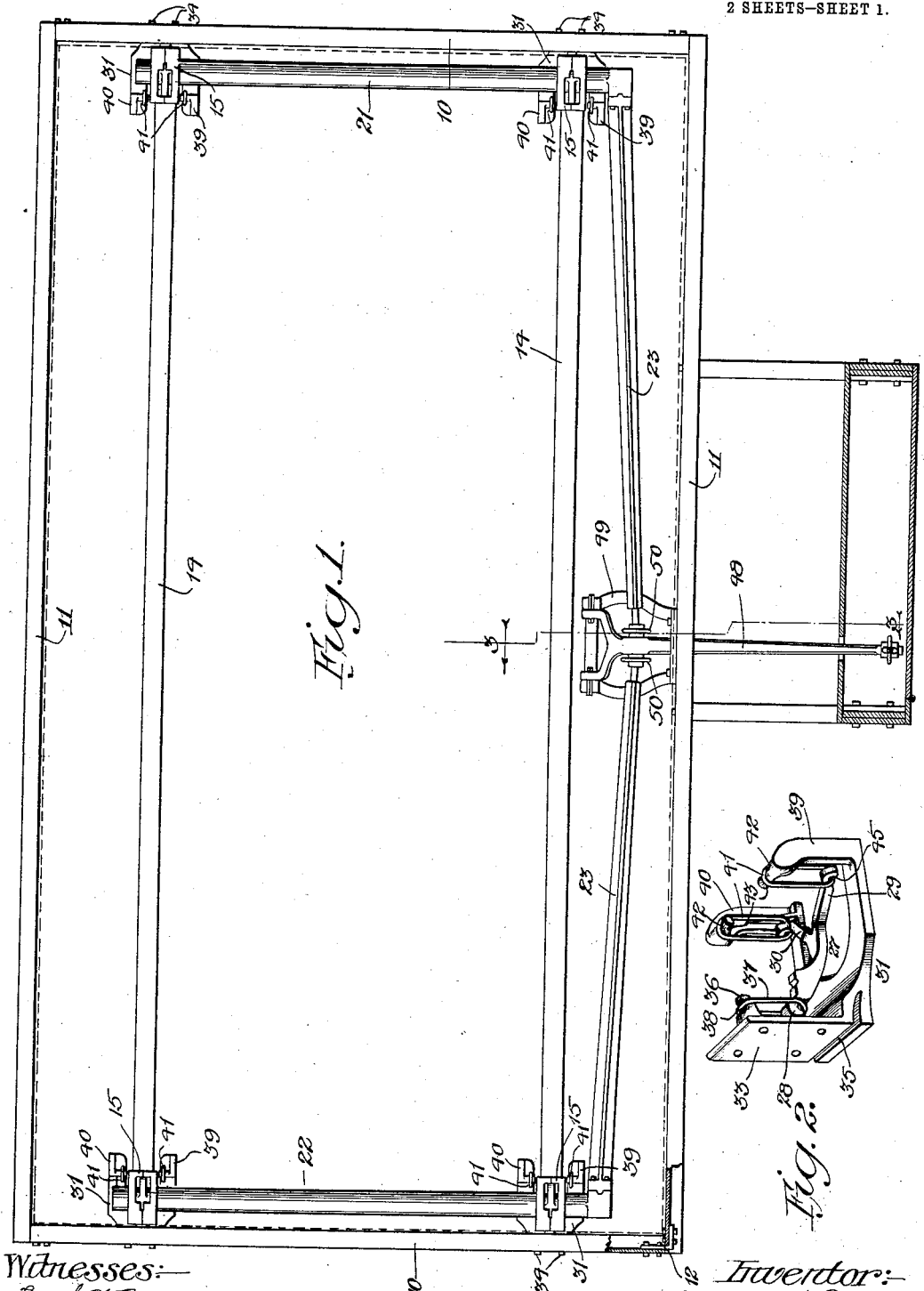
Witnesses:
Frank W. Bemm
Eleanor Hagenow.
Inventor:
Edward J. La Due
By: Fred Gerlach
his Atty.

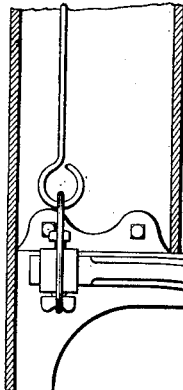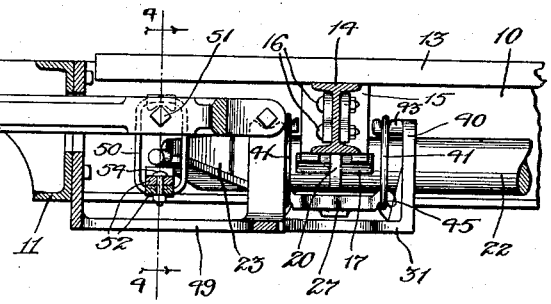

UNITED STATES PATENT OFFICE.

EDWARD J. LA DUE, OF PONTIAC, ILLINOIS.

SCALE.

1,025,145.  Specification of Letters Patent.  Patented May 7, 1912.

Application filed March 27, 1911. Serial No. 617,188.

*To all whom it may concern:*

Be it known that I, EDWARD J. LA DUE, a resident of Pontiac, in the county of Livingston and State of Illinois, have invented certain new and useful Improvements in Scales, of which the following is a full, clear, and exact description.

The invention relates to scales, and more particularly to that type in which the platform is sustained in suitable manner by devices or bearings immediately beneath it, and which are generally known as "pitless" scales.

It is now common practice to employ suspension devices, which are pivotally hung at their upper ends, and on the lower ends of which, the levers whereon the platform is sustained, are fulcrumed, for the purpose of sustaining the platform in such manner, that lateral vibration incident to use, will not result in frictional retardation of the platform or the parts operated thereby, or in variation of the normal or predetermined load necessary to counterbalance the scale-beam. It is also customary to provide "knife-edge" pintles for the pivotal connections of the platform-levers, and in practice it is desirable to avoid all wear, so far as possible, of these "knife-edges", since slight wear or variation in form, will affect the accurate weighing of the scale. In the scales in which the levers are fulcrumed on these suspension-devices, lateral movement of the platform causes bodily shift of the levers, and pivotal or relative movement of the pintles and bearings therefor, in such manner that the edges of the pintles will soon become worn, and then the scale will no longer weigh accurately.

The present invention designs primarily, to provide an improved scale, in which the lever-fulcra will be carried on a support which "floats" or moves bodily with the levers, so that the "knife-edges" will not become worn as a result of lateral movement of the platform, and will not move relatively to their bearings, except when the platform moves vertically in response to superimposed loads. This object is attained, by providing at each place where the levers are fulcrumed, a support which is sustained by suspension-devices, in such manner that it will move bodily and laterally with the levers, and, resultantly, there will be no relative movement, nor wear, between the pintles and their bearings, caused by lateral movement or vibration of the platform.

The invention consists in the several novel features hereinafter set forth and more particularly defined by claims at the conclusion hereof.

In the drawings: Figure 1 is a plan of a scale embodying the invention, the platform being removed, and the scale-beam being omitted. Fig. 2 is a perspective of one of the brackets with a lever-support hung upon suspension-devices therein. Fig. 3 is a section taken on line 3—3 of Fig. 1. Fig. 4 is a section taken on line 4—4 of Fig. 3. Fig. 5 is a plan on an enlarged scale, of one of the improved devices for sustaining the platform-levers. Fig. 6 is a section taken on line 6—6 of Fig. 5. Fig. 7 is a section taken on line 7—7 of Fig. 6.

A rectangular frame, usually made up of channel-beams, and comprising end-rails 10, and side-rails 11, which are secured together by corner-brackets 12, may be sustained on any suitable bed, as well understood in the art. The platform 13, is sustained in this frame, by means hereinafter set forth, and is rigidly secured to a pair of beams 14. To each end of each of the beams 14, a foot or bracket 15, is rigidly secured, being made up, for convenience in manufacture, of sections adapted to be secured to the opposite faces of the beams, by bolts 16. Each bracket has curved surfaces 18, adapted to bear on a pintle 17, which is formed with a knife-edge 19, to minimize friction in operation. Being disposed at the ends of the beams 14, these brackets and pintles support the platform, adjacent all corners thereof and in horizontal position.

The pintles 17, at one end of the platform are secured in arms 20, of a lever 21, and the pintles at the opposite end of the platform are secured in similar arms of a lever 22. Each of the levers 21, 22, has secured to one of its ends, an inwardly extended arm 23, which is operatively connected to the scale-beam. Adjacent each of its ends, each lever 21, 22, is provided with a pair of ears or lugs 24, wherein is secured a fulcrum-pintle 25, having a knife-edge adapted to rest on a bearing-surface 26, of a support 27. The pintles and surfaces provide fulcra about which these levers may swing, when the load upon the platform suffices to counterbalance the scale-beam.

Supports 27, are sustained so they may move bodily and laterally, responsively to lateral movement or vibration of the platform and the platform-levers, and by providing lever-supports of this character, the bearing-edges and surfaces between the levers and said supports will not become worn from the lateral vibration to which the platform is subjected in use. To provide a fulcrum-support which is movable bodily and laterally with the lever, each support 27, comprises three arms, 28, 29 and 30, each of which is sustained by a suspension loop having its upper end pivotally hung on a bracket 31. Each bracket 31, comprises a base; an end-wall 33, adapted to be secured by bolts 34, to the inner side of one of the end-rails 10, of the frame in which the platform is mounted, and having a channel 35, adapted to receive the lower flange of said rail; an arm or lug 36, disposed to one side of the lever-fulcrum, on which a suspension loop 37, is hung in a curved seat 38, the loop and seat being formed to permit the loop to swing universally or in any direction, laterally; and an upwardly extending pair of arms or members 39, 40, which are disposed on the opposite side of the lever-fulcrum, end-wise of arm 36, and so that the platform bearing 18, 19, will be disposed between them. A loop 41, is pivotally hung in a curved seat 42, on an inwardly projecting stud 43, of each of the members 39, 40, respectively. Arms 29, 30, of support 27, are sustained in the lower ends of these loops 41, so that the support may move bodily and laterally in any direction, the loops being curved for that purpose, and held in curved or suitably formed seats 45, in the support. Resultantly these loops 41, and 37, sustain the fulcrum support, so it will move laterally and bodily in any direction, and this construction provides "three-point" suspension-means for the fulcrum-support, by which its horizontality will be maintained. The weight of the platform causes the suspension-loops to remain normally vertical, so that the platform will be sustained in its normal position laterally. Obviously, as a result of this construction, lateral vibration of the platform will cause the levers, their fulcra and the support 27, to move bodily and in unison, and without pivotal movement of the lever relatively to its support, except when the platform is operated vertically by a load, when the scale-beam and its connections will be operated thereby. Thus, wear on the knife-edges of the lever-fulcra will be minimized, and the accuracy of the scale will be maintained.

Any suitable scale-beam may be provided, which will be operated by pivotal movement of the platform-levers 21, 22, about their fulcra, as well understood in the art, and therefore it has not been deemed necessary to illustrate the scale-beam.

The connections for operating the scale-beam, comprise a lever 48, which has its distant end connected to a scale-beam (not shown) and is suitably pivoted on a bracket 49. Each of the arms 23, on the platform-levers, is operatively connected to lever 48, by a pair of suspension-loops 50, which are pivotally hung to swing in any direction on a pintle 51, secured to lever 48, and which carry bearing-members 52, at their lower ends which are connected by a bolt 53, and are free to move pivotally on the loops. Each arm 23, is connected to one of the bearing-members 52, by a point-bearing 54. Being suspended to move laterally in any direction, bodily shift of the platform-levers and arms 23, will move said members 52, bodily and laterally, but not vertically, and therefore these connections are free to permit lateral vibration of the platform without operating the scale-beam, and when the platform-levers are moved vertically, or pivotally by a load, arms 23, will move the suspension-loops 50, downwardly and operate lever 48, and the scale-beam connected thereto.

The invention is not to be understood as restricted to the particular form of the invention set forth in detail, since the same may be varied, within the scope of the appended claims, without departing from the spirit and scope of the invention.

Having thus described the invention, what I claim as new and desire to secure by Letters Patent, is:

1. A scale comprising the combination of a lever, a plurality of suspension devices, a support sustained by the lower ends of said devices, a lever-fulcrum carried by said support, each of said devices being pivoted at its upper end so that its lower end will be free to swing laterally and longitudinally to permit said support and said lever to move conjointly and bodily, longitudinally and transversely of the lever, a platform on said lever, and scale-operating means operated by the pivotal movement of the lever about its fulcrum on said support.

2. A scale comprising the combination of a lever, a plurality of suspension devices, a support sustained by the lower ends of said devices, a lever-fulcrum carried by said support, said device being disposed at the sides of the lever-fulcrum, and each being pivoted at its upper end so that its lower end will be free to swing laterally and longitudinally to permit said support and lever to move conjointly and bodily, longitudinally and transversely of the lever, a platform on said lever, and scale-operating means operated by the pivotal movement of the lever about its fulcrum on said support.

3. A scale comprising the combination of a lever, three suspension devices, a support sustained by the lower ends of said devices, a lever-fulcrum carried by said support, each of said devices being pivoted at its upper end so that its lower end will be free to swing laterally and longitudinally to permit said support and lever to move conjointly and bodily longitudinally and transversely of the lever, a platform on said lever, and scale-operating means operated by the pivotal movement of the lever about its fulcrum on said support.

4. A scale comprising the combination of a lever, a plurality of suspension devices, a support sustained by the lower ends of said devices, a lever-fulcrum carried by said support, each of said devices being pivoted at its upper end so that its lower end will be free to swing laterally and longitudinally to permit said support and lever to move conjointly and bodily, longitudinally and transversely of the lever, a platform on said lever, a knife-edge bearing between said lever and said platform, and scale-operating means operated by the pivotal movement of the lever about its fulcrum on said support.

5. A scale comprising the combination of a frame, a bracket rigidly secured to the frame, a bracket, a lever, a plurality of suspension-devices, each pivoted at its upper end by said bracket so that its lower end will be free to swing laterally and longitudinally of the lever, a support sustained by the lower ends of said suspension devices and movable bodily, laterally and longitudinally, a lever-fulcrum on said support and movable bodily therewith, a platform on said lever, and scale-operating means operated by the pivotal movement of the lever above its fulcrum on said support.

6. A scale comprising the combination of a frame, a bracket rigidly secured to said frame and comprising upwardly extending members disposed inwardly of said support, a plurality of suspension devices, each pivoted at its upper end to one of said upwardly extending members of said bracket so that its lower end will be free to swing laterally and longitudinally, a support sustained by the lower ends of said suspension devices and movable bodily therewith, a lever fulcrumed on said support, a platform on said lever, and scale-operating means operated by the pivotal movement of the lever above its fulcrum on said support.

7. A scale comprising a frame, a bracket comprising a wall secured to one side of said frame, upwardly extending members at the other side and another member adjacent said wall, a support, suspension-devices between each of said members and said support, a platform on the lever, and means, operated by pivotal movement of the lever, for operating a scale-beam.

8. A scale comprising the combination of a frame, a lever, a lever-fulcrum, a bracket rigidly secured to said frame, and having upwardly extending members disposed at opposite sides of the lever-fulcrum, a plurality of suspension devices, each pivoted at its upper end to one of said upwardly extending members of the bracket so that its lower end will be free to move laterally and longitudinally of the lever, a support sustained by the lower ends of said suspension devices and being movable bodily, laterally and longitudinally, said lever being carried by said support and movable bodily therewith, a platform on said lever, and scale-operating means operated by the pivotal movement of the lever above its fulcrum on said support.

9. A scale comprising a frame, a bracket secured to said frame, and comprising a wall at one side thereof, a member adjacent said wall, a plurality of upwardly extending members at the opposite side thereof, a support, a lever fulcrumed on said support between the members at the opposite sides of the bracket, said support having arms corresponding to said members, suspension-devices between said members and said arms respectively, a platform on said lever, and means, operated by pivotal movement of said lever, for operating a scale-beam.

EDWARD J. LA DUE.

Witnesses:
W. E. BAKER,
ELMER ROE.

---

Copies of this patent may be obtained for five cents each, by addressing the "Commissioner of Patents, Washington, D. C."